United States Patent
Simpson et al.

(10) Patent No.: US 10,570,950 B2
(45) Date of Patent: Feb. 25, 2020

(54) SPHERICAL JOINT ASSEMBLY WITH A SPHERICAL BEARING BETWEEN INTEGRAL COLLARS

(71) Applicant: United Technologies Corporation, Farmington, CT (US)

(72) Inventors: Alex J. Simpson, Tolland, CT (US); Edward A. Krystowski, Granby, CT (US)

(73) Assignee: United Technologies Corporation, Framington, CT (US)

(*) Notice: Subject to any disclaimer, the term of this patent is extended or adjusted under 35 U.S.C. 154(b) by 895 days.

(21) Appl. No.: 15/161,895

(22) Filed: May 23, 2016

(65) Prior Publication Data

US 2017/0335885 A1  Nov. 23, 2017

(51) Int. Cl.
*F16C 11/06* (2006.01)

(52) U.S. Cl.
CPC ...... *F16C 11/0604* (2013.01); *F16C 11/0695* (2013.01)

(58) Field of Classification Search
CPC .................. F16C 11/0604; F16C 11/0695
See application file for complete search history.

(56) References Cited

U.S. PATENT DOCUMENTS

| | | |
|---|---|---|
| 1,466,756 A | 9/1923 | Rich |
| 1,943,364 A | 1/1934 | Betz |
| 2,066,695 A | 1/1937 | Peo |
| 3,161,185 A | 12/1964 | Justinien |
| 3,831,888 A * | 8/1974 | Baker ............... B64D 27/18 244/54 |
| 3,832,022 A | 8/1974 | Reinsma et al. |
| 4,065,077 A * | 12/1977 | Brooks ............... B64D 27/26 244/54 |
| 4,232,563 A | 11/1980 | Peterson et al. |
| 4,243,192 A | 1/1981 | Johnson |
| 4,889,458 A | 12/1989 | Taylor |
| 4,943,013 A | 7/1990 | Kapala et al. |
| 5,120,195 A | 6/1992 | Schmaling et al. |
| 5,245,823 A | 9/1993 | Barcza |
| 5,251,986 A | 10/1993 | Arena |

(Continued)

FOREIGN PATENT DOCUMENTS

| | | |
|---|---|---|
| DE | 102007016171 | 10/2008 |
| EP | 0760433 | 3/1997 |
| GB | 1585795 | 3/1981 |

OTHER PUBLICATIONS

Extended EP Search Report for EP Appln. No. 17172078.2 dated Oct. 19, 2017.

*Primary Examiner* — Daniel J Wiley
(74) *Attorney, Agent, or Firm* — Getz Balich LLC

(57) ABSTRACT

A bearing joint assembly includes a bearing sleeve, a first mount, a pair of second mounts and a fastener. The bearing sleeve extends axially along a centerline and includes a spherical bearing, a first collar and a second collar. The spherical bearing is axially between the first collar and the second collar. An annular channel is formed by and extends axially between the spherical bearing and the first collar. The first mount is mounted on and slidably engages the spherical bearing. The bearing sleeve is axially between the second mounts. The fastener projects through the bearing sleeve and secures the bearing sleeve to the second mounts.

9 Claims, 7 Drawing Sheets

(56) References Cited

U.S. PATENT DOCUMENTS

| | | | |
|---|---|---|---|
| 5,523,530 A | 6/1996 | Byrnes et al. | |
| 5,649,417 A | 7/1997 | Hey | |
| 5,931,597 A | 8/1999 | Urbach | |
| 6,173,919 B1 | 1/2001 | Le Blaye | |
| 7,438,493 B2 | 10/2008 | Holmes et al. | |
| 7,594,794 B2 | 9/2009 | Merry et al. | |
| 7,654,766 B2 | 2/2010 | Zuge et al. | |
| 7,753,612 B2 | 7/2010 | Bouru et al. | |
| 7,845,176 B2 | 12/2010 | Martin | |
| 8,002,489 B2 * | 8/2011 | Mahy | F16C 11/0614 267/141.2 |
| 8,740,136 B2 | 6/2014 | Audart-Noel et al. | |
| 8,851,417 B2 | 10/2014 | Sandy | |
| 8,925,944 B2 | 1/2015 | Byrnes | |
| 9,133,768 B2 | 9/2015 | Martin | |
| 9,327,570 B2 | 5/2016 | Karpman et al. | |
| 9,592,917 B2 * | 3/2017 | Cassagne | F02C 7/20 |
| 9,593,708 B2 * | 3/2017 | Cassagne | F16B 39/24 |
| 9,676,489 B2 | 6/2017 | Serra et al. | |
| 9,874,146 B2 * | 1/2018 | Keegan | F01D 25/285 |
| 9,925,838 B2 | 3/2018 | Karpman et al. | |
| 2005/0281611 A1 | 12/2005 | Matczak | |
| 2006/0088371 A1 | 4/2006 | Dunn et al. | |
| 2007/0122232 A1 | 5/2007 | Buchner et al. | |
| 2007/0189649 A1 | 8/2007 | Montazeri et al. | |
| 2009/0016809 A1 * | 1/2009 | Buhl | B60G 7/005 403/75 |
| 2010/0215426 A1 | 8/2010 | Mann et al. | |
| 2011/0293360 A1 | 12/2011 | Becker et al. | |
| 2013/0114995 A1 | 5/2013 | Godiot et al. | |
| 2013/0328284 A1 * | 12/2013 | Byrnes | B60G 7/005 280/124.151 |
| 2014/0360152 A1 | 12/2014 | Waitkus et al. | |
| 2015/0016965 A1 | 1/2015 | Sawyers-Abbott et al. | |
| 2015/0322998 A1 | 11/2015 | Lee et al. | |
| 2015/0337891 A1 | 11/2015 | Mano | |
| 2016/0083101 A1 | 3/2016 | Ronski et al. | |
| 2017/0102026 A1 | 4/2017 | Florent et al. | |
| 2017/0146126 A1 | 5/2017 | Hudson et al. | |

* cited by examiner

SPHERICAL JOINT ASSEMBLY WITH A SPHERICAL BEARING BETWEEN INTEGRAL COLLARS

This invention was made with government support under Contract No. N00019-02-C-3003 awarded by the United States Navy. The government may have certain rights in the invention.

BACKGROUND OF THE INVENTION

1. Technical Field

This disclosure relates generally to a moveable joint and, more particularly, to a spherical joint assembly for pivotally coupling components together.

2. Background Information

Various types of joints are known in the art for coupling two components together. An example of such a joint is a spherical joint, which pivotally couples the components together. Various spherical joint configurations are known and have various advantageous. However, there is still a need in the art for an improved spherical joint and, more particularly, an improved spherical joint assembly with increased robustness to tensile loads.

SUMMARY OF THE DISCLOSURE

According to an aspect of the present disclosure, a bearing joint assembly is provided that includes a bearing sleeve, a first mount, a pair of second mounts and a fastener. The bearing sleeve extends axially along a centerline and includes a spherical bearing, a first collar and a second collar. The spherical bearing is axially between the first collar and the second collar. An annular channel is formed by and extends axially between the spherical bearing and the first collar. The first mount is mounted on and slidably engages the spherical bearing. The bearing sleeve is axially between the second mounts. The fastener projects through the bearing sleeve and secures the bearing sleeve to the second mounts.

According to another aspect of the present disclosure, another bearing joint assembly is provided that includes a bearing sleeve, a first mount, a pair of second mounts and a fastener. The bearing sleeve extends axially along a centerline and includes a spherical bearing, a first collar and a second collar. The spherical bearing is axially between the first collar and the second collar. The spherical bearing includes a radial outer spherical surface with a minimum radius value. The first collar includes a radial outer collar surface with a maximum radius value that is greater than the minimum radius value of the radial outer spherical surface. The first mount is mounted on and slidably engages the radial outer spherical surface. The bearing sleeve is axially between the second mounts. The fastener projects through the bearing sleeve and secures the bearing sleeve to the second mounts.

According to still another aspect of the present disclosure, another bearing joint assembly is provided that includes a bearing sleeve and a linkage. The bearing sleeve extends axially along a centerline and includes a spherical bearing, a first collar and a second collar. The spherical bearing is axially between the first collar and the second collar. An annular channel is formed by and extends axially between the spherical bearing and the first collar. At least the spherical bearing and the first collar are included in a monolithic body. The linkage includes a first mount slidably engaged with the spherical bearing. The spherical bearing is captured within an aperture extending axially through the first mount.

The annular channel may be a first annular channel. A second annular channel may be formed by and extend axially between the spherical bearing and the second collar.

The bearing sleeve may be a monolithic body.

The spherical bearing may include a radial outer spherical surface with a minimum radius value. The first collar may include a radial outer collar surface with a maximum radius value that is greater than the minimum radius value of the radial outer spherical surface.

The radial outer spherical surface may have a maximum radius value. The maximum radius value of the radial outer collar surface may be less than or equal to the maximum radius value of the radial outer spherical surface.

The first collar may include a radial outer collar surface. At least a portion of the radial outer collar surface may taper radially inwards as the first collar extends axially towards the spherical bearing.

The at least a portion of the radial outer collar surface may have a generally conical geometry.

The at least a portion of the radial outer collar surface may be a first portion. A second portion of the radial outer collar surface may have a cylindrical geometry.

The bearing joint assembly may include a strut and a turbine engine component. The strut may include the first mount. The turbine engine component may include the second mounts.

An annular channel may be formed by and extend axially between the spherical bearing and the first collar.

The first collar may include a radial outer collar surface. At least a portion of the radial outer collar surface may taper radially inwards as the first collar extends axially towards the spherical bearing.

The foregoing features and the operation of the invention will become more apparent in light of the following description and the accompanying drawings.

DETAILED DESCRIPTION OF THE INVENTION

Figure 1:
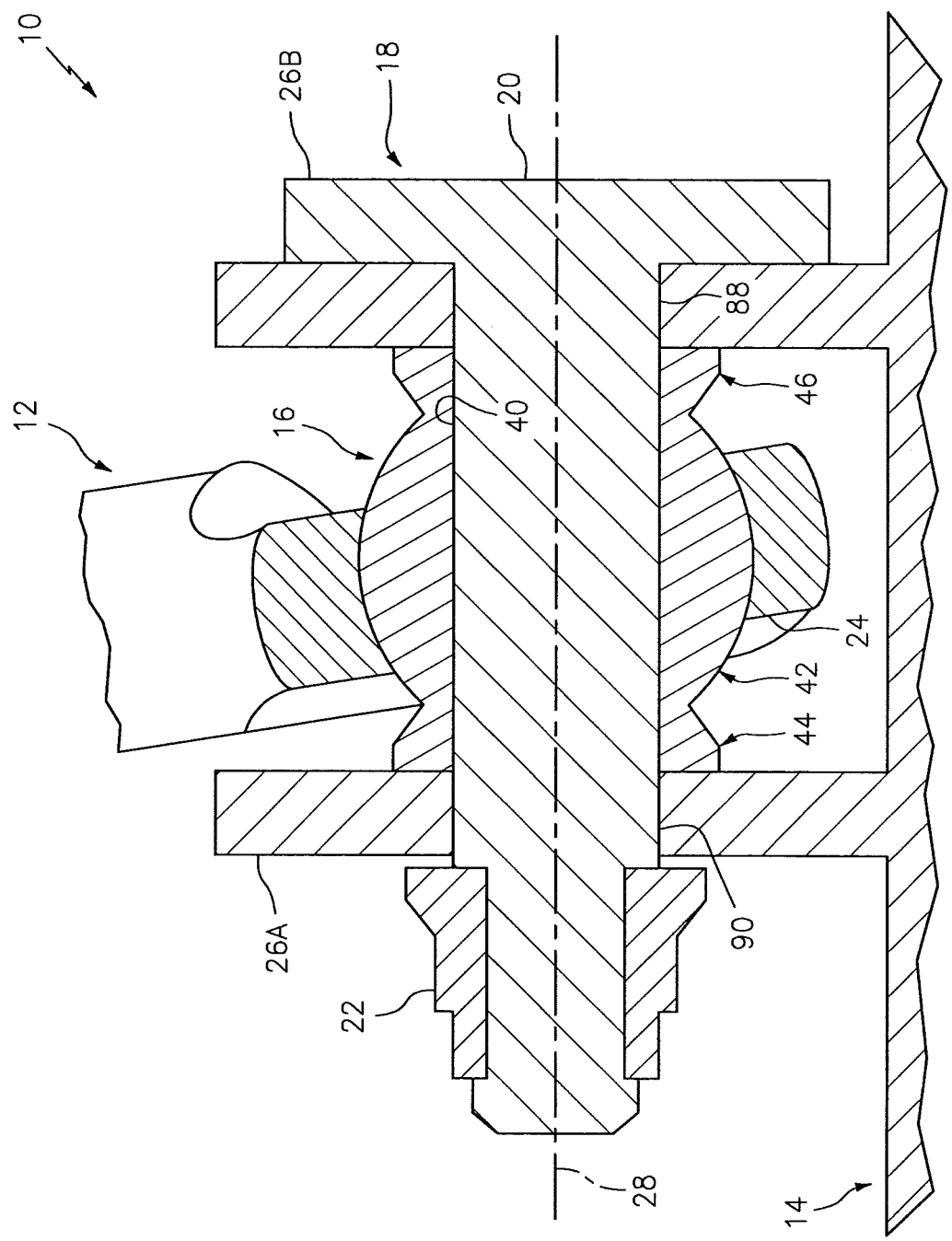
FIG. 1 is a partial, side sectional illustration of a spherical bearing joint assembly.

FIG. 1 illustrates a bearing joint assembly 10. This bearing joint assembly 10 is configured to provide a spherical bearing joint between two components 12 and 14, which enables generally spherical pivoting movement between the components 12 and 14. Such a bearing joint assembly may be configured for an aeronautical, industrial or other gas turbine engine application. For example, the first component 12 may be an actuation linkage (e.g., a strut) for actuating movement of another component of the gas turbine engine; e.g., a component of a variable exhaust nozzle, a variable vane, etc. The bearing joint assembly 10 of the present disclosure, however, is not limited to such exemplary component configurations, or to gas turbine engine applications.

The bearing joint assembly 10, in particular, can be configured for use in any application where a joint moveably (or statically) couples two components together.

The bearing joint assembly 10 of FIG. 1 includes the first component 12, the second component 14, a bearing sleeve 16 and a fastener 18, which may include a bolt 20 and a nut 22 (or any other type of pin and retainer). The bearing joint assembly 10 also includes at least a first mount 24 (e.g., a flange or tab) and two or more (shown as a pair in FIG. 1) of second mounts 26A and 26B (e.g., a flange or tab).

The first component 12 may include the first mount 24. For example, the first mount 24 may be configured as a distal flange/tab/tongue of the first component 12; e.g., the actuation linkage. Alternatively, the first mount 24 may be formed discrete from and subsequently attached (e.g., mechanically fastened and/or bonded) to the first component 12.

The second component 14 may include the second mounts 26A and 26B. For example, the second mounts 26A and 26B may be configured as tabs/flanges projecting out from the second component 14; e.g., the turbine engine component. Alternatively, one or more of the second mounts 26A and 26B may each be formed discrete from and subsequently attached to the second component 14.

Figure 2:
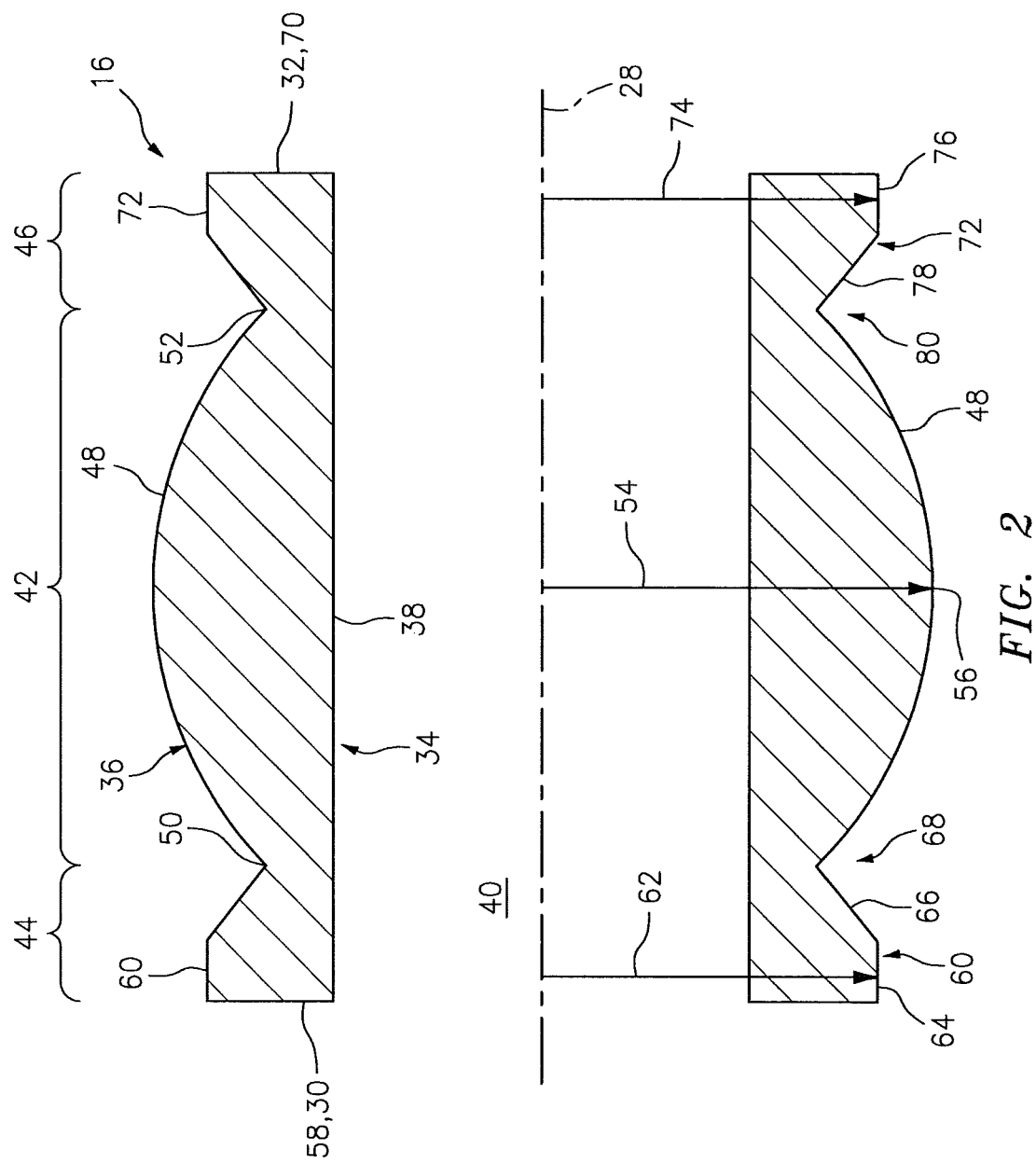
FIG. 2 is a side sectional illustration of a bearing sleeve.

Referring to FIG. 2, the bearing sleeve 16 extends axially along a centerline 28 between opposing first and second axial ends 30 and 32. The bearing sleeve 16 extends radially out from an inner periphery 34 to an outer periphery 36, where an inner sleeve surface 38 at the inner periphery 34 forms a bore 40 axially through the bearing sleeve 16. The bearing sleeve 16 also extends circumferentially around the centerline 28, thereby providing the bearing sleeve 16 with a generally tubular geometry.

The bearing sleeve 16 includes a spherical bearing 42 and one or more collars 44 and 46. The bearing sleeve 16 of FIG. 2 is formed as a monolithic body from material such as, but not limited to, metal, polymer, composite, etc. For example, all portions 42, 44 and 46 of the bearing sleeve 16 may be formed (e.g., cast, machined, additively manufactured, etc.) integral with one another as a single unit. Thus, none of the bearing sleeve portions 42, 44 and 46 are discretely formed elements and then (e.g., mechanically) attached to one another. The present disclosure, however, is not limited to such an exemplary monolithic bearing sleeve body embodiment. For example, in other embodiments, one of the collars 44 or 46 can be formed discrete from and subsequently attached to the bearing sleeve 16.

Referring again to FIG. 2, the spherical bearing 42 is disposed and extends axially between the first collar 44 and the second collar 46. The spherical bearing 42 extends radially out from the inner sleeve surface 38 to a radial outer spherical surface 48 (e.g., a spherical bearing surface) at the outer periphery 36. This spherical surface 48 extends axially between a first end 50 and a second end 52, where the first end 50 is adjacent (or in close proximity to) the first collar 44 and the second end 52 is adjacent (or in close proximity to) the second collar 46. The spherical surface 48 extends circumferentially around the centerline 28.

A radius 54 of the spherical surface 48 changes as the spherical surface 48 axially extends between the first end 50 and the second end 52 to provide the spherical surface 48 with a circular side sectional geometry; see FIG. 2. With this geometry, the radius 54 has a first minimum radius value (e.g., left hand side minimum radius value) at the first end 50. The radius 54 has a second minimum radius value (e.g., right hand side minimum radius value) at the second end 52, which second minimum radius value may be approximately equal to the first minimum radius value. At an intermediate point 56 (e.g., a midpoint) axially between the first end 50 and the second end 52, the radius 54 has a maximum radius value (e.g., a peak value) that is greater than the first minimum radius value and the second minimum radius value. The term "minimum" may describe an axial point where the radius 54 has the smallest value towards a respective side of a peak; e.g., the intermediate point 56. The term "maximum" may describe an axial point (peak point) where the radius 54 has the largest value; e.g., at the intermediate point 56.

The first collar 44 is disposed at (e.g., on, adjacent or proximate) the first axial end 30. The first collar 44 of FIG. 2, for example, forms a first end surface 58 at the first axial end 30. The first collar 44 extends radially out from the inner sleeve surface 38 to a radial outer collar surface 60 at the outer periphery 36. This collar surface 60 extends axially from the first end surface 58 at the first axial end 30 to (and may be contiguous with) the first end 50 of the spherical surface 48. The collar surface 60 extends circumferentially around the centerline 28.

A radius 62 of the collar surface 60 may change as the collar surface 60 axially extends from the first axial end 30 to the spherical bearing 42 to provide the collar surface 60 with a radially tapering side sectional geometry. The collar surface 60 of FIG. 2, for example, includes a first portion 64 and a second portion 66. The first portion 64 may have a substantially cylindrical geometry, where the radius 62 is substantially constant. The second portion 66 may have a substantially conical geometry, which radially tapers (e.g., the radius 62 decreases) as the second portion 66 extends axially from the first portion 64 to the spherical surface 48. With this configuration, the radius 62 of the first portion 64 has a maximum radius value and the radius 62 of the second portion 66 adjacent the spherical surface 48 has a minimum radius value, which minimum radius value is substantially equal to the first minimum radius value of the radius 54. The maximum radius value of the radius 62 is greater than the first minimum radius value of the radius 54. The maximum radius value of the radius 62 is less than (or may be substantially equal) the maximum radius value of the radius 54, which may facilitate assembly of the spherical bearing 42 with the first mount 24 as described below.

Figure 3:
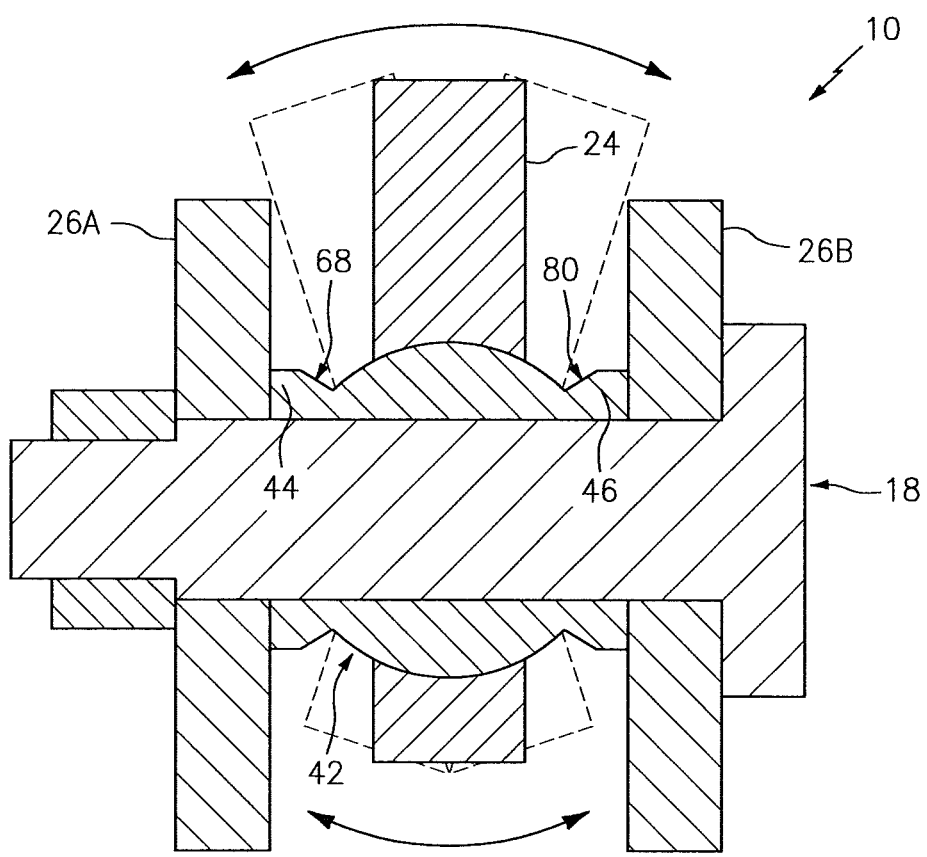
FIG. 3 is a partial, side sectional illustration of the spherical bearing joint assembly depicting articulation of a first mount relative to second mounts.

The first collar 44 and the spherical bearing 42 collectively form a first annular channel 68. This first annular channel 68 is formed by and extends axially between the collar surface 60 and the spherical surface 48. The first annular channel 68 extends radially into the bearing sleeve 16 (towards the centerline 28) to an intersection (e.g., trough point) between the first collar 44 and the spherical bearing 42. The first annular channel 68 extends circumferentially around the centerline 28 through the bearing sleeve 16. This first annular channel 68 provides space for the first mount 24 to pivot about the spherical bearing 42 and, for example, freely articulate between the second mounts 26A and 26B as shown in FIG. 3. The first collar 44 of FIG. 3 therefore is configured (e.g., sized and shaped) to enable unobstructed movement of the first mount 24 by the first collar 44. Of course, as shown in FIG. 3, movement of the first mount 24 may be obstructed by other elements such as the second mounts 26A and 26B.

Referring to FIG. 2, the second collar 46 is disposed at (e.g., on, adjacent or proximate) the second axial end 32. The second collar 46 of FIG. 2, for example, forms a second end surface 70 at the second axial end 32. The second collar 46 extends radially out from the inner sleeve surface 38 to a radial outer collar surface 72 at the outer periphery 36. This collar surface 72 extends axially from the second end surface 70 at the second axial end 32 to (and may be contiguous with) the second end 52 of the spherical surface 48. The collar surface 72 extends circumferentially around the centerline 28.

A radius 74 of the collar surface 72 may change as the collar surface 72 axially extends from the second axial end 32 to the spherical bearing 42 to provide the collar surface 72 with a radially tapering side sectional geometry. The collar surface 72 of FIG. 2, for example, includes a first portion 76 and a second portion 78. The first portion 76 may have a substantially cylindrical geometry, where the radius 74 is substantially constant. The second portion 78 may have a substantially conical geometry, which radially tapers (e.g., the radius 74 decreases) as the second portion 78 extends axially from the first portion 76 to the spherical surface 48. With this configuration, the radius 74 of the first portion 76 has a maximum radius value and the radius 74 of the second portion 78 adjacent the spherical surface 48 has a minimum radius value, which minimum radius value is substantially equal to the first minimum radius value of the radius 54. The maximum radius value of the radius 74 is greater than the first minimum radius value of the radius 54. The maximum radius value of the radius 74 is less than (or may be substantially equal) the maximum radius value of the radius 54, which may facilitate assembly of the spherical bearing 42 with the first mount 24 as described below.

The second collar 46 and the spherical bearing 42 collectively form a second annular channel 80. This second annular channel 80 is formed by and extends axially between the collar surface 72 and the spherical surface 48. The second annular channel 80 extends radially into the bearing sleeve 16 (towards the centerline 28) to an intersection (e.g., trough point) between the second collar 46 and the spherical bearing 42. The second annular channel 80 extends circumferentially around the centerline 28 through the bearing sleeve 16. This second annular channel 80 provides space for the first mount 24 to pivot about the spherical bearing 42 and, for example, freely articulate between the second mounts 26A and 26B as shown in FIG. 3. The second collar 46 of FIG. 3 therefore is configured (e.g., sized and shaped) to enable unobstructed movement of the first mount 24 by the second collar 46. Of course, as shown in FIG. 3, movement of the first mount 24 may be obstructed by other elements such as the second mounts 26A and 26B.

The first collar 44 and the second collar 46 of FIGS. 2 and 3 are illustrated with substantially mirror image configurations; e.g., geometry (shapes), sizes, etc. However, the bearing sleeve 16 of the present disclosure is not limited to such an exemplary embodiment. For example, in other embodiments, one of the collars 44, 46 may have a different configuration (e.g., geometry and/or size) than the other.

Figure 4:
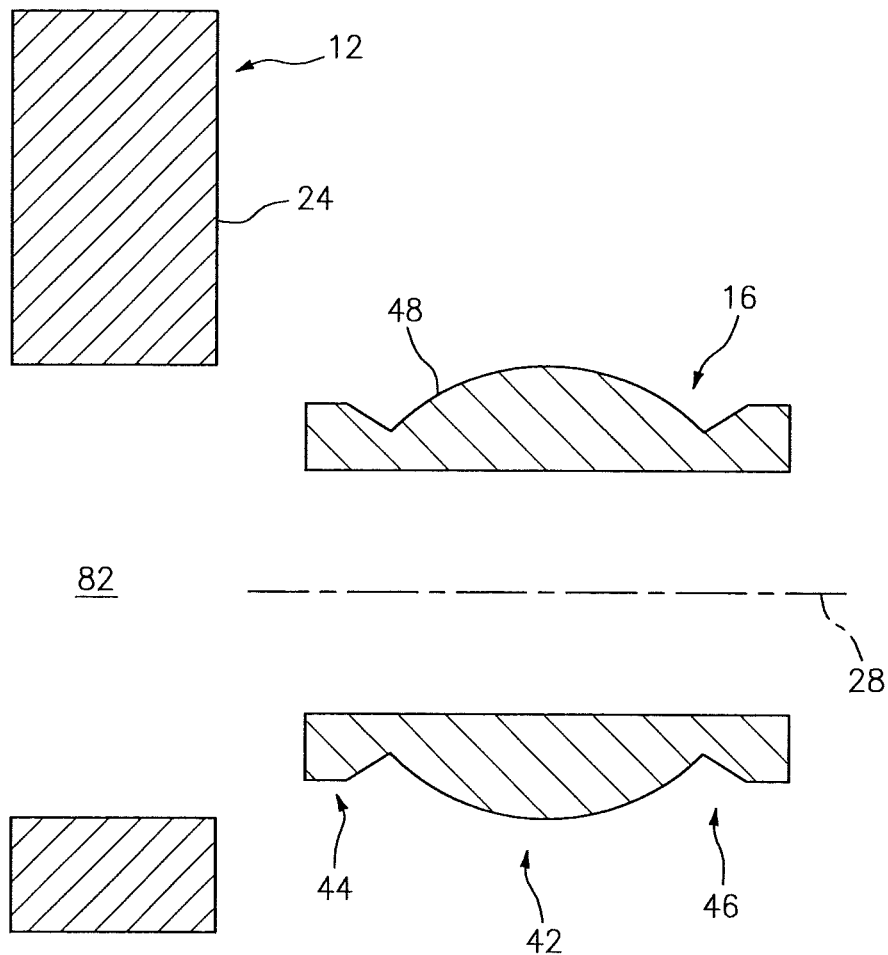
FIGS. 4 to 6 illustrate a sequence depicting mounting of a first mount on a spherical bearing.
Figure 5:
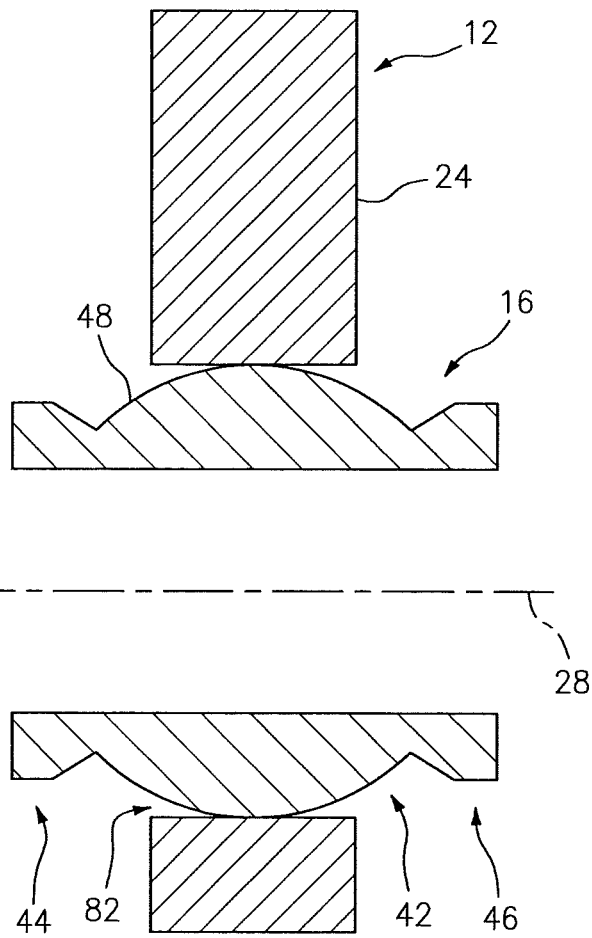
Figure 6:
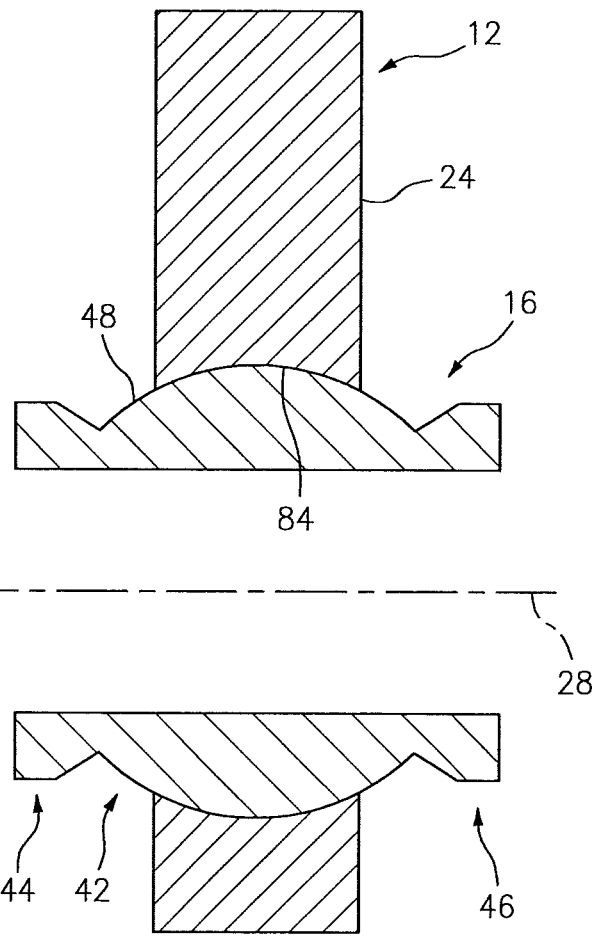

FIGS. 4 to 6 illustrate a sequence depicting the mounting of the first mount 24 on the spherical bearing 42. As illustrated by this sequence and FIG. 2, the maximum radius value of the radius 62, 74 of at least one of the collars 44, 46 is sized to be less than (or equal to) the maximum radius value of the radius 54 of the spherical bearing 42 such that the collar 44, 46 may pass through a bearing aperture 82 in the first mount 24. This enables the spherical bearing 42 to be arranged within the bearing aperture 82 as shown in FIG. 5. The first mount 24 may then be swaged to capture the spherical bearing 42 within the bearing aperture 82. As best seen in FIG. 6, the spherical surface 48 engages (e.g., contacts) a surface 84 of the first mount 24 that forms the bearing aperture 82, which enables the first mount 24 to slide on the spherical surface 48 and pivot relative to the bearing sleeve 16.

Referring to FIG. 1, the bearing sleeve 16 is disposed axially between the second mounts 26A and 26B after the first mount 24 is mounted to the spherical bearing 42. With this configuration, the first collar 44 is disposed axially next to (and may axially engage) the second mount 26A. The second collar 46 is disposed axially next to (and may axially engage) the second mount 26B. The bolt 20 is inserted sequentially through mounting apertures (88, 40 and 90) respectively in the second mount 26B, the bearing sleeve 16 and the second mount 26A. The nut 22 is threaded onto an end of the bolt 20, thereby securing the bearing sleeve 16 and, thus, the first mount 24 with the second mounts 26A and 26B.

During operation of the bearing joint assembly 10, the first mount 24 may pivot about the spherical bearing 42 as illustrated in FIG. 3. The bearing joint assembly 10 may also transfer loads between the first component 12 and the second component 14. The bearing joint assembly 10 may be in compression where the mounts 24 and 26A-B push towards one another. Alternatively, the bearing joint assembly 10 may be in tension where the mounts 24 and 26A-B pull away from one another. Depending upon the magnitude of the load being transferred, the bolt 20 may have a tendency to bend. Such bending subjects the spherical bearing 42 to a compressive load whereas the collars 44 and 46 are subjected to tensile loads. To accommodate these inverse loads and resist ovalization of the bearing sleeve 16, the collars 44 and 46 are sized with relatively large radiuses 62 and 74 (see FIG. 2); e.g., where the maximum radius values of the radiuses 62 and 74 is greater than the minimum radius values of the radius 54.

Figure 7:
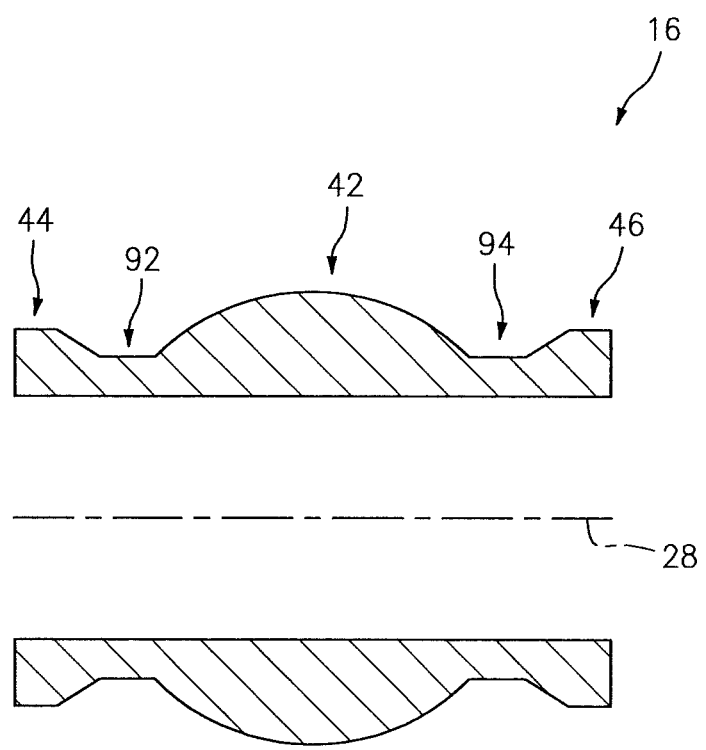
FIG. 7 is a side sectional illustration of another bearing sleeve.

The bearing sleeve 16 of the present disclosure may have various configurations different than that specifically described above. For example, at least a portion of the collar surface 60, 72 is configured with a generally spherical geometry. In some embodiments, at least a portion of the collar surface 60, 72 may have a complex (e.g., splined and/or compound) geometry. In some embodiments, referring to FIG. 7, the collar 44, 46 may be separated from the spherical bearing 42 by a slight gap; e.g., a spacer 92, 94.

The first mount 24 is described above as being swaged on the spherical bearing 42. However, in other embodiments, other methodologies may also or alternatively be used to capture the spherical bearing 42 within the bearing aperture 82. For example, one or more bearing caps may be attached to sides of the first mount 24 after the spherical bearing 42 is positioned within the bearing aperture 82.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A bearing joint assembly, comprising:
  a bearing sleeve extending axially along a centerline and including a spherical bearing, a first collar and a second collar, the spherical bearing axially between the first collar and the second collar, wherein an annular channel is formed by and extends axially between the spherical bearing and the first collar;

the spherical bearing including a radial outer spherical surface, the first collar including a radial outer collar surface, and at least a portion of the radial outer collar surface tapering radially inwards as the first collar extends axially to the radial outer spherical surface;

a first mount swaged on and slidably engaging the spherical bearing;

a pair of second mounts, the bearing sleeve axially between the second mounts; and a fastener projecting through the bearing sleeve and securing the bearing sleeve to the second mounts.

2. The bearing joint assembly of claim 1, wherein the annular channel is a first annular channel, and a second annular channel is formed by and extends axially between the spherical bearing and the second collar.

3. The bearing joint assembly of claim 1, wherein the bearing sleeve is a monolithic body.

4. The bearing joint assembly of claim 1, wherein
the radial outer spherical surface has a minimum radius value; and
the radial outer collar surface has a maximum radius value that is greater than the minimum radius value of the radial outer spherical surface.

5. The bearing joint assembly of claim 4, wherein
the radial outer spherical surface has a maximum radius value; and
the maximum radius value of the radial outer collar surface is less than or equal to the maximum radius value of the radial outer spherical surface.

6. The bearing joint assembly of claim 1, wherein the at least a portion of the radial outer collar surface has a generally conical geometry.

7. The bearing joint assembly of claim 1, wherein the at least a portion of the radial outer collar surface is a first portion, and a second portion of the radial outer collar surface has a cylindrical geometry.

8. A bearing joint assembly, comprising:
a bearing sleeve extending axially along a centerline and including a spherical bearing, a first collar and a second collar, the spherical bearing axially between the first collar and the second collar, wherein an annular channel is formed by and extends axially between the spherical bearing and the first collar;

the spherical bearing including a radial outer spherical surface, the first collar including a radial outer collar surface, and at least a portion of the radial outer collar surface tapering radially inwards as the first collar extends axially to the radial outer spherical surface;

a first mount mounted on and slidably engaging the spherical bearing;

a pair of second mounts, the bearing sleeve axially between the second mounts; and a fastener projecting through the bearing sleeve and securing the bearing sleeve to the second mounts;

a strut comprising the first mount; and a turbine engine component comprising the second mounts, the turbine engine component configured as a component of a variable exhaust nozzle of a gas turbine engine.

9. A bearing joint assembly, comprising:
a bearing sleeve extending axially along a centerline and including a spherical bearing, a first collar and a second collar, the spherical bearing axially between the first collar and the second collar, wherein an annular channel is formed by and extends axially between the spherical bearing and the first collar;

the spherical bearing including a radial outer spherical surface, the first collar including a radial outer collar surface, and at least a portion of the radial outer collar surface tapering radially inwards as the first collar extends axially to the radial outer spherical surface;

a first mount mounted on and slidably engaging the spherical bearing;

a pair of second mounts, the bearing sleeve axially between the second mounts; and a fastener projecting through the bearing sleeve and securing the bearing sleeve to the second mounts;

a strut comprising the first mount; and a turbine engine component comprising the second mounts, the turbine engine component configured as a component of a variable vane for a gas turbine engine.

* * * * *